(12) United States Patent
Watanabe et al.

(10) Patent No.: US 9,541,171 B2
(45) Date of Patent: Jan. 10, 2017

(54) AUTOMATIC TRANSMISSION FOR VEHICLES

(71) Applicant: JATCO Ltd, Fuji-shi, Shizuoka (JP)

(72) Inventors: Kenichi Watanabe, Sagamihara (JP); Shoji Sugaya, Fuji (JP); Kazuo Oguri, Ito (JP); Masao Arimatsu, Atsugi (JP); Jun Shinozaki, Sagamihara (JP); Yoshiaki Hatano, Isehara (JP)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 14/779,537

(22) PCT Filed: Jan. 7, 2014

(86) PCT No.: PCT/JP2014/050043
§ 371 (c)(1),
(2) Date: Sep. 23, 2015

(87) PCT Pub. No.: WO2014/156204
PCT Pub. Date: Oct. 2, 2014

(65) Prior Publication Data
US 2016/0047443 A1    Feb. 18, 2016

(30) Foreign Application Priority Data

Mar. 26, 2013  (JP) .................. 2013-064598

(51) Int. Cl.
*F16H 3/58*    (2006.01)
*F16H 3/66*    (2006.01)

(52) U.S. Cl.
CPC ....... *F16H 3/663* (2013.01); *F16H 2200/0052* (2013.01); *F16H 2200/0056* (2013.01);
(Continued)

(58) Field of Classification Search
CPC .............. F16H 3/663; F16H 2200/0052; F16H 2200/2007;F16H 2200/2023; F16H 2200/2043
See application file for complete search history.

(56) References Cited

U.S. PATENT DOCUMENTS 5,525,117 A * 6/1996 Morisawa ............... F16H 3/663
475/205
2003/0109353 A1   6/2003 Miyazaki et al.
(Continued)

FOREIGN PATENT DOCUMENTS

DE   10 2009 019 046 A1   11/2010
JP        06-200998 A      7/1994
(Continued)

OTHER PUBLICATIONS

Belz, Thomas: "Varianten von Mehrgang-Planetengetrieben", https://register.epo.org/application?documentId=EYPWMGE67270DSU&appnumber=EP13756488&showPdfPage=all, Mar. 8, 2016, pp. 1-19.

*Primary Examiner* — Huan Le
(74) *Attorney, Agent, or Firm* — Foley & Lardner LLP (57) ABSTRACT

An automatic transmission for a vehicle includes: the input shaft being constantly connected to the second element, arranged to be connected to the second sun gear by an engagement of the first clutch, and arranged to be engaged with the third sun gear by an engagement of the second clutch, the output member being constantly connected to the second ring gear, the first element being arranged to be fixed to the stationary portion by an engagement of the first brake, the third element being constantly connected to the second pinion carrier, and arranged to fixed to the stationary portion by an engagement of the second brake, and the third sun gear being arrange to be fixed to the stationary portion by an engagement of the third brake.

10 Claims, 6 Drawing Sheets

(52) U.S. Cl.
CPC ............... *F16H 2200/2007* (2013.01); *F16H 2200/2023* (2013.01); *F16H 2200/2043* (2013.01)

(56) References Cited

U.S. PATENT DOCUMENTS

| | | | |
|---|---|---|---|
| 2008/0039266 A1* | 2/2008 | Shim | F16H 3/66 475/280 |
| 2012/0065019 A1* | 3/2012 | Hart | F16H 3/663 475/271 |
| 2013/0029799 A1* | 1/2013 | Park | F16H 3/663 475/276 |

FOREIGN PATENT DOCUMENTS

| | | |
|---|---|---|
| JP | 2003-240068 A | 8/2003 |
| JP | 2005-069256 A | 3/2005 |
| JP | 2011-179561 A | 9/2011 |
| WO | WO-2007/140126 A2 | 12/2007 |

\* cited by examiner

|  | 1st | 2nd | 3rd | 4th | 5th | 6th | Rev |
|---|---|---|---|---|---|---|---|
| 3 (BK1) |  |  |  | ○ | ○ | ○ |  |
| 4 (CL1) | ○ | ○ | ○ | ○ |  |  |  |
| 5 (CL2) |  |  | ○ |  | ○ |  | ○ |
| 6 (BK2) | ○ |  |  |  |  |  | ○ |
| 7 (BK3) |  | ○ |  |  |  | ○ |  |
|  |  |  |  |  |  |  |  |
| GEAR RATIO | 2.759 | 1.561 | 1.000 | 0.736 | 0.547 | 0.435 | −2.133 |
| R/C | 6.336 | | | | | | |
| Rev/1s | 0.773 | | | | | | |

AUTOMATIC TRANSMISSION FOR VEHICLES

TECHNICAL FIELD

This invention relates to an automatic transmission.

BACKGROUND ART

A device described in a patent document has been known as a conventional automatic transmission for a vehicle. This conventional automatic transmission includes a planetary gear set including a Ravigneaux type planetary gear set and one set of single pinion type planetary gear set; and frictional engagement elements which includes two clutches and three brakes, and which are hydraulically operated.

PRIOR ART DOCUMENT

Patent Document

Japanese Patent Application Publication No. 2003-240068

SUMMARY OF THE INVENTION

Problems which the Invention is Intended to Solve

However, in the above-described conventional automatic transmission for the vehicle, there are following problems.

That is, in the above-described conventional automatic transmission for the vehicle, the ratio coverage (R/C: which is total shift ratio width, and which is a value obtained by dividing the gear ratio at the forward first speed by the gear ratio of the maximum shift stage) which relates to the start characteristic and the climbing characteristic (uphill performance) at the low shift stage, and the improvement of the reduction of the engine noise, and the improvement of the fuel economy at the high shift stage is small (6.1). It is not possible to enlarge the ratio coverage while ensuring the appropriate step ratio.

It is, therefore, an object of the present invention to provide an automatic transmission for a vehicle which is devised to solve the above-described problems, and to ensure a large ratio coverage while ensuring a preferable step ratio.

Means for Solving the Problem

For this objection, an automatic transmission for a vehicle comprises:
an input shaft;
an output member;
a stationary portion;
a first planetary gear set including three rotation elements of a first sun gear, a first ring gear, and a first pinion carrier;
a second planetary gear set which is a Ravigneaux type, and which includes a second sun gear, a third sun gear, a second pinion engaged with the second sun gear, a third pinion engaged with the second pinion and the third sun gear, a second pinion carrier which rotatably supports the second pinion and the third pinion, and a second ring gear engaged with the third pinion; and
five frictional engagement elements of a first clutch, a second clutch, a first brake, a second brake, and a third brake,
when the three rotational elements of the first planetary gear set are arranged on a common velocity diagram in dependence on distances corresponding to a teeth number ratio of the first planetary gear set, the three rotational elements of the first planetary gear set being defined as a first element, a second element, and a third element in order of arrangement on the common velocity diagram,
the input shaft being constantly connected to the second element, arranged to be connected to the second sun gear by an engagement of the first clutch, and arranged to be engaged with the third sun gear by an engagement of the second clutch,
the output member being constantly connected to the second ring gear,
the first element being arranged to be fixed to the stationary portion by an engagement of the first brake,
the third element being constantly connected to the second pinion carrier, and arranged to fixed to the stationary portion by an engagement of the second brake, and
the third sun gear being arrange to be fixed to the stationary portion by an engagement of the third brake.

Moreover, preferably, the first clutch is engaged at a first speed, a second speed, a third speed, and a fourth speed; the second clutch is engaged at the third speed, a fifth speed, and a reverse speed; the first brake is engaged at the fourth speed, the fifth speed, and a sixth speed; and the second brake is engaged at the first speed and the reverse speed; and the third brake is engaged at the second speed and the sixth speed.

Moreover, preferably, the first planetary gear set is a single pinion type planetary gear set; the first element is the first sun gear; the second element is the first pinion carrier; and the third element is the first ring gear.

Moreover, preferably, the first planetary gear set is a double pinion type planetary gear set; the first element is the first sun gear; the second element is the first ring gear; and the third element is the first pinion carrier.

Moreover, preferably, the first brake and the second brake are disposed on a side which is farther from a driving source with respect to the output member in an axial direction; the third brake, the first clutch, and the second clutch are disposed on a side which is nearer to the driving source with respect to the output member in the axial direction; the second clutch is disposed radially inside the third brake; the first clutch is disposed radially inside the second clutch; the first brake and the second brake are disposed radially outside the first planetary gear set and the second planetary gear set; and the second brake is disposed on a side which is nearer to the driving source than the first brake in the axial direction.

Moreover, preferably, the automatic transmission further comprises a first connection member that includes an outer circumference side to which the third brake is connected, and an inner circumference side to which the second clutch is connected; the first connection member is connected through an inner circumference side of the output member to the first sun gear; the automatic transmission further comprises a second connection member which includes an outer circumference side to which the first clutch is connected; the second connection member is connected through an inner circumference side of the first connection member to the second sun gear; the automatic transmission further comprises a third connection member which includes an inner circumference side to which the first clutch is connected; and the third connection member is connected to the input shaft through a portion of the second connection member which is nearer to the driving source in the axial direction.

BENEFIT OF THE INVENTION

In the present invention, the automatic transmission is constituted as described above. Accordingly, it is possible to decrease the number of the components and the weight, and to attain the size reduction. Moreover, it is possible to improve the mountability to the vehicle, and the fuel economy, and to decrease the cost. Furthermore, it is possible to obtain the large ratio coverage while ensuring the good step ratio. It is possible to obtain the large driving force at the low shift stage, and to improve the start characteristic and the climbing characteristic. Moreover, it is possible to attain the reduction of the engine noise and the improvement of the fuel economy at the high shift stage while suppressing the engine speed.

Moreover, the first clutch, the second clutch, and the first to third brakes are engaged as described above. Accordingly, it is possible to obtain the forward six shift stages and the reverse shift stage.

Furthermore, the first planetary gear set is the single pinion type planetary gear set. Accordingly, it is possible to attain the simple structure of the first planetary gear set at the low cost.

Moreover, the first planetary gear set is the double pinion type planetary gear set. Accordingly, it is possible to obtain the gear ratios and the step ratio which are different from those of the single pinion type planetary gear set.

Furthermore, the first clutch, the second clutch, and the first brake to the third brake are disposed as described above. Accordingly, it is possible to decrease the axial size and the radial size, and to improve the mountability to the vehicle.

Moreover, the first connection member to the third connection member are provided as described above. Accordingly, it is possible to decrease the axial size and the radial size by the simple structure, and to improve the mountability to the vehicle.

DESCRIPTION OF EMBODIMENTS

Hereinafter, embodiments according to the present invention are illustrated in detail based on embodiments shown in the drawings.

First Embodiment

First, an overall structure of an automatic transmission for a vehicle according to a first embodiment is illustrated.

The automatic transmission for the vehicle according to this first embodiment is applied to a front engine front wheel driving vehicle, and a rear engine rear wheel driving vehicle, that is, an engine lateral disposing type.

Figure 1:
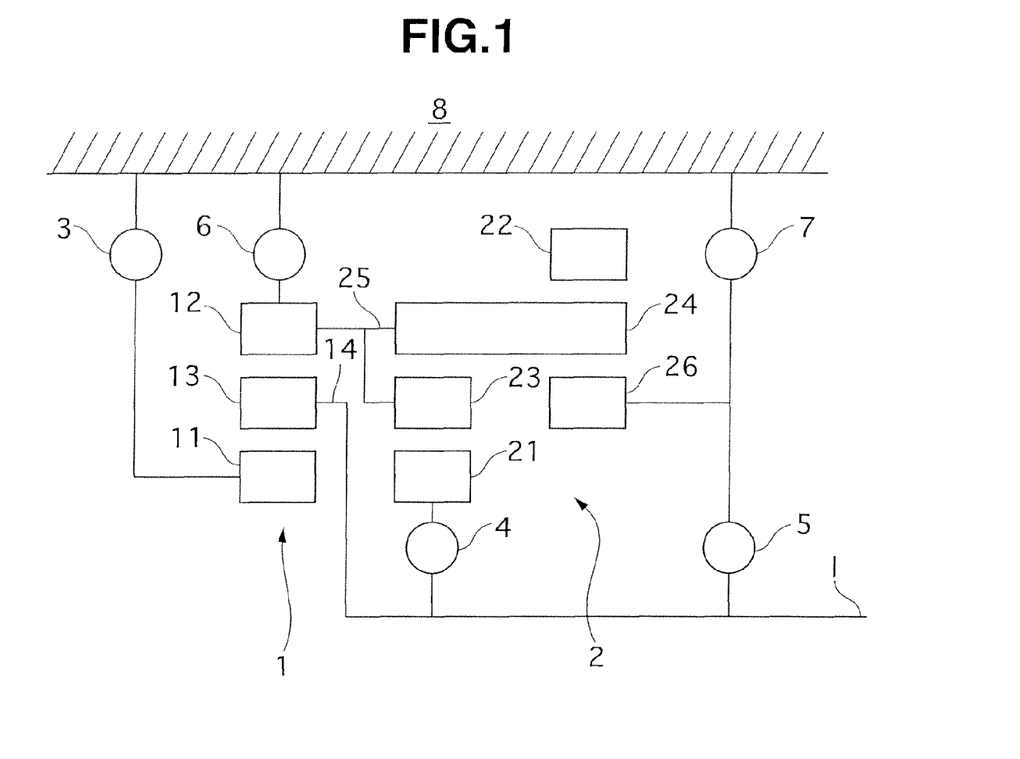
FIG. 1 is a view showing a skeleton of an automatic transmission for a vehicle according to a first embodiment of the present invention.
Figure 10:
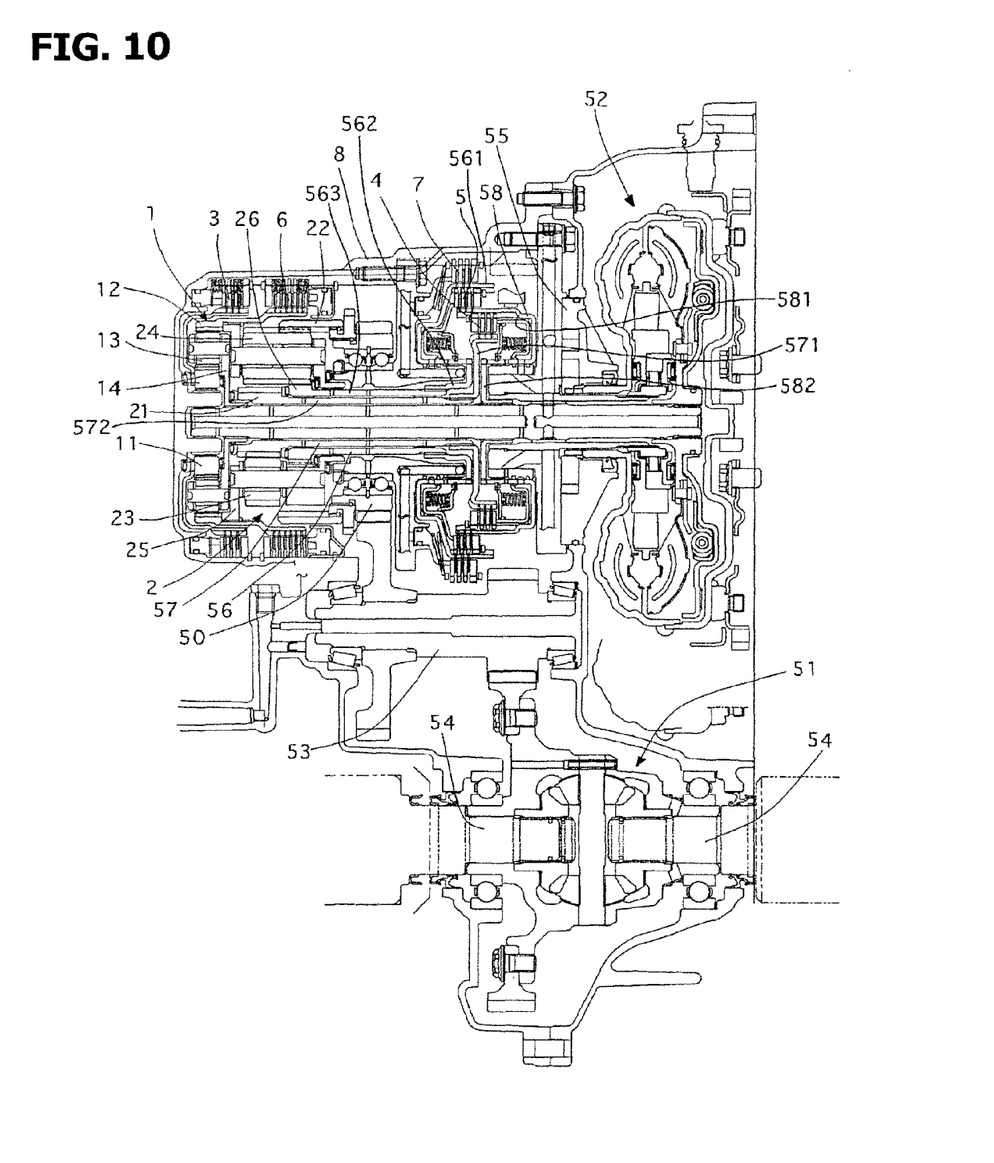
FIG. 10 is a sectional side view of the automatic transmission for the vehicle according to the first embodiment.

FIG. 1 shows a skeleton of the automatic transmission for the vehicle. Besides, FIG. 1 shows an upper half of a central shaft (an shaft passing through a center axis of an input shaft I). A lower half is omitted. Besides, FIG. 10 shows a section of the automatic transmission for the vehicle according to the first embodiment.

As shown in the same drawing, the automatic transmission for the vehicle according to the first embodiment includes the input shaft I, an output member O (a transmitting gear 50 shown in FIG. 10, which is constantly connected to a second ring gear 22); a first planetary gear set 1; a second planetary gear set 2; hydraulically operated frictional engagement elements constituted by two clutches and three brakes of a first clutch 4, a second clutch 5, a first brake 3, a second brake 6, a third brake 7, and a case 8 of the automatic transmission (corresponding to a stationary portion in the present invention).

The input shaft I is arranged to be connected through a torque converter and so on to an engine (not shown) (corresponding to a driving source in the present invention). The output member O is connected through a differential gear device 51 shown in FIG. 10 to driving wheels (not shown).

The first planetary gear set 1 is a single pinion type planetary gear set. The first planetary gear set 1 includes three rotation elements of a first sun gear 11 disposed on the center side, a first ring gear 12 disposed radially outside the first sun gear 11, and a first pinion carrier 14 rotatably supporting a plurality of first pinions 13 which are disposed between the first sun gear 11 and the first ring gear 12, and which are engaged with the first sun gear 11 and the first ring gear 12. In this case, a teeth number ratio α1 of the first planetary gear set 1 (a teeth number ratio of the first sun gear 11/a teeth number ratio of the first ring gear 12) is set to, for example, 0.563.

The second planetary gear set 2 is a Ravigneaux type planetary gear set. The second planetary gear set 2 includes a second sun gear 21 and a third sun gear 26 which are disposed on the center side to be departed from each other in the axial direction; a plurality of second inner pinions 23 which are engaged with the second sun gear 21 radially outside the second sun gear 21; a plurality of second outer pinions 24 which are disposed radially outside the second inner pinions 23 and the third sun gear 26, and which are engaged with the second inner pinion 23 and the third sun gear 26; a second pinion carrier 25 rotatably supporting the second inner pinions 23 and the second outer pinions 24; and a second ring gear 22 which is disposed radially outside the second outer pinions 24, and which is engaged with the second outer pinions 24.

In this case, the second planetary gear set 2 is constituted by a double pinion type planetary gear set including the second sun gear 21, the second ring gear 22, the second inner pinions 23, and the second outer pinions 24; and a single pinion type planetary gear set including the third sun gear 26, the second ring gear 22, and the second outer pinions 24. In this case, a teeth number ratio $\alpha 2$ of the double pinion type planetary gear set and a teeth number ratio $\alpha 3$ of the single pinion type planetary gear set are set to, for example, 0.363 and 0.469.

The rotation elements of the first planetary gear set 1 and the second planetary gear set 2 are connected, and can be connected and fixed as illustrated below.

First, in the first planetary gear set 1, the first sun gear 11 can be fixed to the case 8 by engagement of the first brake 3. The first ring gear 12 is constantly connected to the second pinion carrier 25. The first ring gear 12 is arranged to be fixed to the case 8 by the second brake 6. The first pinion carrier 14 is constantly connected to the input shaft I.

In the second planetary gear set 2, the second sun gear 21 is arranged to be connected to the input shaft I by the engagement of the first clutch 4. The second ring gear 22 is engaged with the second outer pinions 24. The second pinion carrier 25 is connected to the first ring gear 12 as described above. The third sun gear 26 is arranged to be connected to the input shaft I by the engagement of the second clutch 5. The third sun gear 26 is arranged to be fixed to the case 8 by the engagement of the third brake 7.

Figure 2:
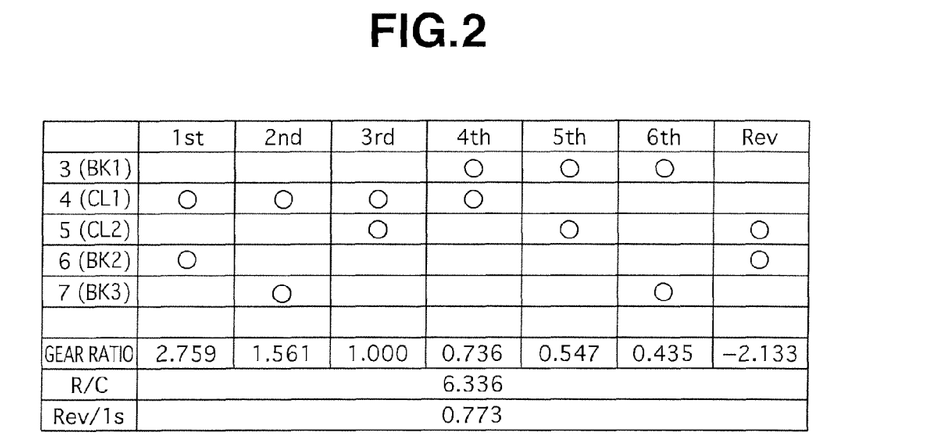
FIG. 2 is a view showing an operation table showing an operation of frictional engagement elements used in the automatic transmission for the vehicle according to the first embodiment, and a gear in each shift stage.

The engagements and disengagements of the frictional engagement elements of the automatic transmission according to the first embodiment which are connected as described above are shown in the operation table of FIG. 2. In this operation table, a lateral direction represents the speed stages from the first speed to the sixth speed, and the reverse speed. In the longitudinal direction, the frictional engagement elements are arranged. In the operation table, symbols ◯ represent the engagement states of the frictional engagement elements. Moreover, blanks represent the disengagement states of the frictional engagement elements. Besides, a lower portion of the operation table describes the gear ratios of the respective shift stages, the ratio coverage of the automatic transmission (R/C: which is the total shift ratio width, a value obtained by dividing the gear ratio of the forward first speed by the gear ratio of the maximum shift stage), and reverse ratio/first speed ratio (Rev/1st).

Moreover, the above-described frictional engagement elements are controlled to be engaged or disengaged by the supply and the release of the pressurized oil from control valves (not shown) which are electrically controlled by a controller (not shown). These configuration and the operations of the controller and the control valves are well known. Accordingly, in this case, these illustrations are omitted.

Next, the power transmitting paths in the respective shift stages are illustrated by using the common velocity diagram (common speed diagram). Besides, the second planetary gear set 2 is showed, for the explanation, to be divided into the planetary gear set of the double pinion type and the planetary gear set of the single pinion type.

In this case, in the common velocity diagram, a longitudinal axis represents a rotation speed of each rotation element. In the lateral axis, these rotation elements are assigned in accordance with the sizes of the teeth number ratios $\alpha 1$ to $\alpha 3$ of the first to third planetary gear sets.

That is, in the lateral axis, in a case of the planetary gear set of the single pinion type, rotation speed axes of three rotation elements of the ring gear, the pinion carrier, and the sun gear are disposed in this order (regardless of rightward or leftward direction) to be apart from each other so that a distance between the pinion carrier and the sun gear becomes 1 when a distance between the pinion carrier and the sun gear is set to the teeth number ratio a of the planetary gear set.

In this case, a portion above zero in the longitudinal axis is the rotation speed in the direction identical to the engine. A portion below zero in the longitudinal axis is the rotation speed in the direction opposite to the engine.

In the common velocity diagram, the engagement relationships among the ring gear, the pinion, and the sun gear are linear relationships in which the teeth and the teeth are engaged with each other one-to-one. Accordingly, in a case where the rotation speeds of the rotation elements are connected, it becomes the linear relationship.

Moreover, in FIG. 3 to FIG. 9 showing a common velocity diagram of the respective shift stages, the first planetary gear set 1, the planetary gear set of the double pinion type of the second planetary gear set 2, and the planetary gear set of the single pinion type of the second planetary gear set 2 are disposed in this order from the left side toward the right side. In the drawings, the sun gear is represented by S. The pinion carrier is represented by C. The ring gear is represented by R. Subscripts 1 and 2 represent numbers (first and second) of the planetary gear set to which these belong.

That is, the sun gear 11 of the first planetary gear set 1 is represented by S1. The pinion carrier 14 is represented by C1. The ring gear 12 is represented by R1. The sun gear 11, the pinion carrier 14, and the ring gear 12 correspond to the first element, the second element, and the third element, in the present invention. Moreover, the second sun gear of the second planetary gear set 2 is represented by S2. The second ring gear 22 is represented by R2. The second pinion carrier 25 is represented by C2. Besides, the only third sun gear is represented by S3.

Accordingly, in the common velocity diagram of all FIG. 3 to FIG. 9, the speed axes S1, C1, R1, S2, R2, C2, S3, C2, and R2 corresponding to the first sun gear (the first element) 11, the first pinion carrier 14 (the second element), the first ring gear 12 (the third element), the second sun gear 21, the second ring gear 22, the second pinion carrier 25, and the third sun gear 26 are arranged in this order from the left side toward the right side in the drawing. Besides, in the common velocity diagram of FIG. 3 to FIG. 9, the input is represented by ◯. The output is represented by △. The rotation speed of the input shaft I is set to 1 in the common velocity diagram for simplifying the calculation of the gear ratio. Moreover, the gear ratio in the respective shift stage described below are values when $\alpha 1$ to $\alpha 3$ are set to 0.563, 0.363, and 0.469.

First, in a case where the automatic transmission is in the N (neutral) position and P (parking) position, the engagement pressure is not supplied to all of the frictional engagement elements. Accordingly, the first planetary gear set 1 and the second planetary gear set 2 are in the free state. The first planetary gear set 1 and the second planetary gear set 2 does not transmit the power. Accordingly, the power from the engine is not transmitted to output member O.

When the driver moves a selector lever (not shown) to D position (drive, that is, a forward running), the vehicle starts to run. At this start of the running, the vehicle speed is low. Accordingly, the first speed is attained.

Figure 3:
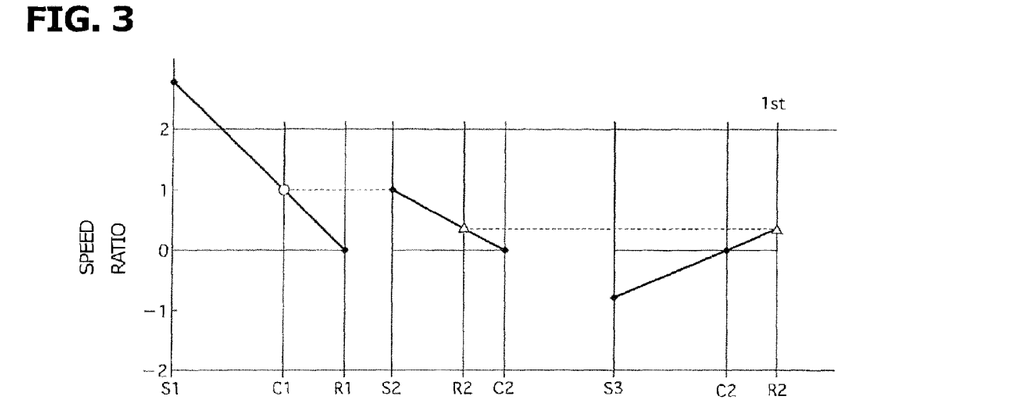
FIG. 3 is a common velocity view at a forward first speed in the automatic transmission for the vehicle according to the first embodiment.

That is, at the first speed, the first clutch 4 and the second brake 6 are engaged.

Accordingly, in the first planetary gear set 1, the first pinion carrier 14 is connected to the input shaft I so that the first pinion carrier 14 is rotated at the speed identical to that of the input shaft I. The first ring gear 12 is fixed to the case 8 by the engagement of the second brake 6, so that the rotation speed of the first ring gear 12 is 0. Accordingly, the first sun gear 11 is rotated by an overdrive rotation speed.

In the double pinion side of the second planetary gear set 2, the second sun gear 21 is connected to the input shaft I by the engagement of the first clutch 4 so that the second sun gear 21 is rotated at the speed identical to that of the input shaft I. The second pinion carrier 25 is connected to the first ring gear 12. Accordingly, the second pinion carrier 25 is fixed to the case 8 by the engagement of the second brake 6 so that the rotation speed of the second pinion carrier 25 is 0. Accordingly, that second ring gear 22 and the output member are rotated by the first speed (the gear ratio 2.759) which is the speed reduction rotation speed.

Besides, the third sun gear 26 of the single pinion side of the second planetary gear set 2 is rotated at the speed reduction rotation speed opposite to the driving direction of the engine since the second ring gear 22 is rotated at the above-described speed reduction rotation speed, and the second pinion carrier 25 is fixed.

Figure 4:
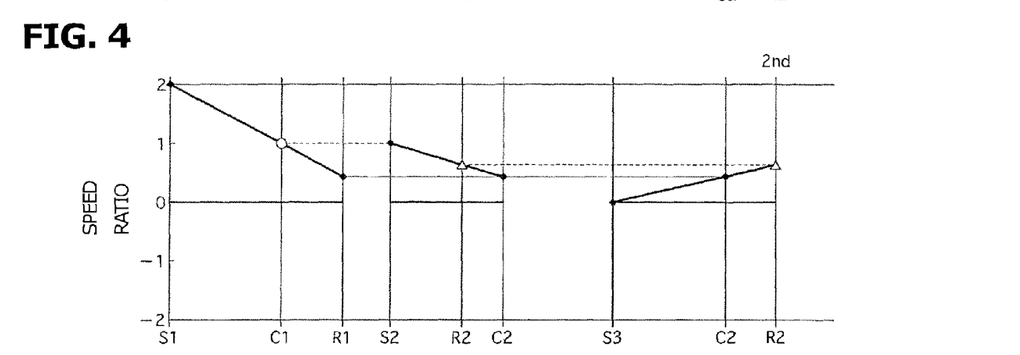
FIG. 4 is a common velocity view at a forward second speed in the automatic transmission for the vehicle according to the first embodiment.

In a case where the vehicle speed is increased, the controller disengages the second brake 6, and engages the third brake 7 so as to be shifted from the first speed to the second speed. At this time, the engagement of the first clutch 4 is maintained similarly to the first speed. The common velocity diagram in this state is shown in FIG. 4.

In this case, in the first planetary gear set 1 and the double pinion side of the second planetary gear set 2, the first pinion carrier 14 and the second sun gear 21 are connected to the input shaft I by the engagement of the first clutch 4 so that the first pinion carrier 14 and the second sun gear 21 are rotated at the speed identical to that of the first clutch 4. The first ring gear 12 is connected to the second pinion carrier 25 so that the first ring gear 12 is rotated at the rotation speed identical to that of the second pinion carrier 25. At this time, the rotation speed of the third sun gear 26 of the singe pinion side of the second planetary gear set 2 is 0 by the engagement of the third brake 7.

Accordingly, the first sun gear 11 is rotated at the overdrive rotation speed. The first ring gear 12 and the second pinion carrier 25 are rotated at the same rotation speed. The second ring gear 22 and the output member are rotated at the second speed (the gear ratio 1.561) which is the speed reduction rotation speed that is higher than the speed reduction rotation speed of the first ring gear 12 and the second pinion carrier 25 and the first speed.

Figure 5:
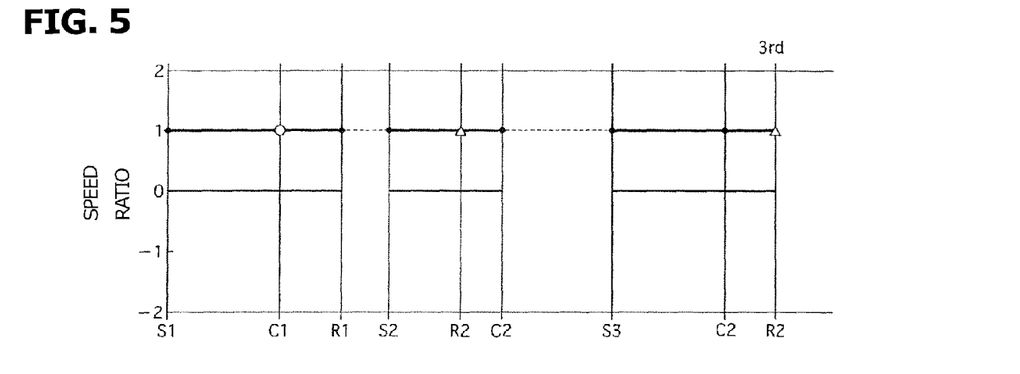
FIG. 5 is a common velocity view at a forward third speed in the automatic transmission for the vehicle according to the first embodiment.

In a case where the vehicle speed is further increased and the controller disengages the third brake 7, and engages the second clutch 5, the automatic transmission is shifted from the second speed to the third speed. At this time, the engagement of the first clutch 4 is maintained. The common velocity diagram in this state is shown in FIG. 5.

That is, at the third speed, the second sun gear 21 is connected to the input shaft I by the engagement between the first pinion carrier 14 and the first clutch 4. The third sun gear 26 is connected to the input shaft I by the engagement of the second clutch 5. Accordingly, the second sun gear 21 and the third sun gear 26 are rotated at the rotation speed identical to that of the input shaft I. The first ring gear 12 is connected to the second pinion carrier 25, so that the first ring gear 12 and the second pinion carrier 25 are rotated at the same speed.

Accordingly, all of the rotation elements of the first planetary gear set 1 and the second planetary gear set rotate as a unit. Consequently, the output member is rotated at the third speed (the gear ratio 1.000) which is the direct connection.

Figure 6:
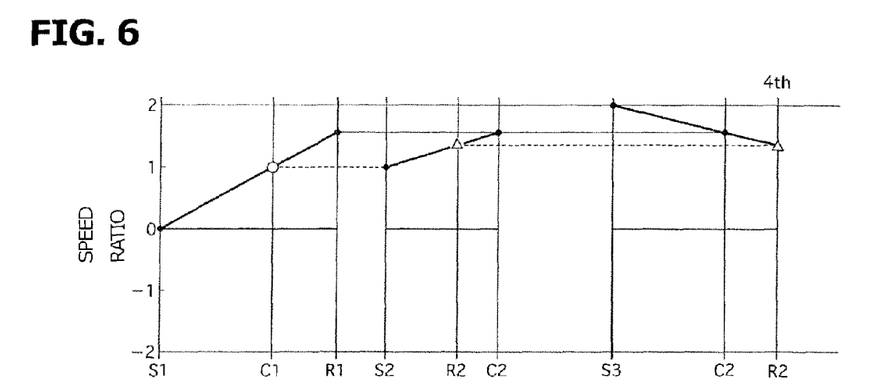
FIG. 6 is a common velocity view at a forward fourth speed in the automatic transmission for the vehicle according to the first embodiment.

In a case where the vehicle speed is further increased and the controller disengages the second clutch 5, and engages the first brake 3, the automatic transmission is shifted from the third speed to the fourth speed. In this case, the engagement of the first clutch 4 is maintained. FIG. 6 shows the common velocity diagram in this state.

At this fourth speed, in the first planetary gear set 1, the first pinion carrier 14 is connected to the input shaft I, so that the first pinion carrier 14 is rotated at the rotation speed identical to that of the input shaft I. The first sun gear 11 is fixed to the case 8 by the engagement of the first brake 3, so that the rotation speed of the first sun gear 11 is 0. Accordingly, the first ring gear 12 is rotated at the overdrive rotation speed.

In the double pinion side of the second planetary gear set 2, the second sun gear 21 is connected to the input shaft I by the engagement of the first clutch 4, so that the second sun gear 21 is rotated at the rotation speed identical to that of the input shaft I. The second pinion carrier 25 is connected to the first ring gear 12, so that the second pinion carrier 25 is rotated at the overdrive rotation speed identical to that of the first ring gear 12. Accordingly, the second ring gear 22 and the output member is rotated at the fourth speed (the gear ratio 0.736) which is the overdrive rotation speed that is lower than that of the second pinion carrier 25.

Besides, the third sun gear 26 of the single pinion side of the second planetary gear set 2 is rotated at the overdrive rotation speed which is further higher than those of the second pinion carrier 25 and the second ring gear 22.

Figure 7:
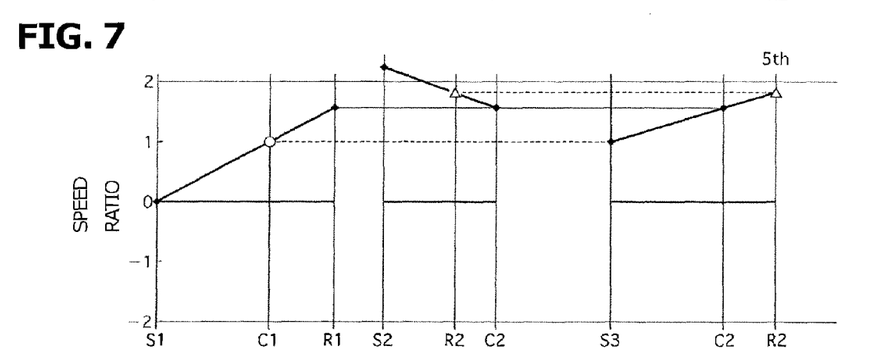
FIG. 7 is a common velocity view at a fifth speed in the automatic transmission for the vehicle according to the first embodiment.

In a case where the vehicle speed is further increased and the controller disengages the first clutch 4, and engages the second clutch 5, the automatic transmission is shifted from the fourth speed to the fifth speed. In this case, the engagement of the first brake 3 is maintained. FIG. 7 shows the common velocity diagram in this state.

At this fifth speed, the first planetary gear set 1 is in the state identical to that of the fourth speed. The first pinon carrier 14 is rotated at the rotation speed identical to that of the input shaft I. The rotation speed of the first sun gear 11 is 0 by the engagement of the first brake 3. The first ring gear 12 is rotated at the overdrive rotation speed.

In the second planetary gear set 2, the second pinion carrier 25 is rotated at the overdrive rotation speed identical to that of the first ring gear 12. The third sun gear 26 is rotated at the rotation speed identical to that of the input shaft I by the engagement of the second clutch 5.

Accordingly, the second ring gear 22 and the output member are rotated at the fifth speed (the gear ratio 0.547) which is the overdrive rotation speed that is higher than that of the fourth speed.

Besides, in this case, the second sun gear 21 is rotated at the overdrive rotation speed which is higher than that of the second ring gear 22.

Figure 8:
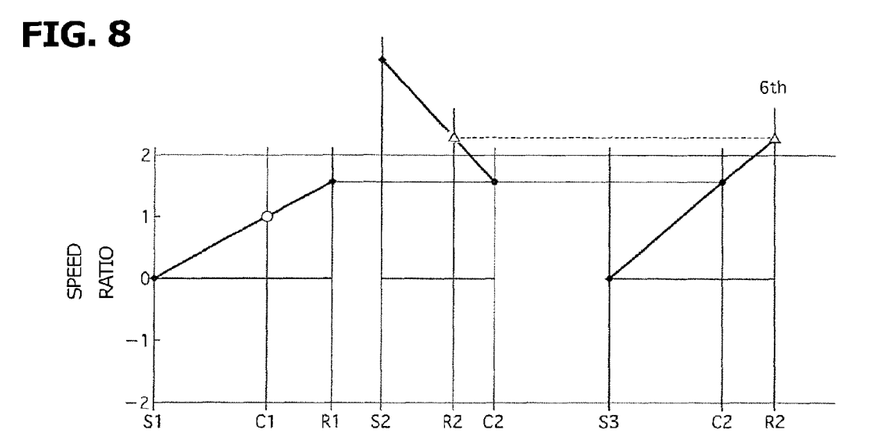
FIG. 8 is a common velocity view at a sixth speed in the automatic transmission for the vehicle according to the first embodiment.

In a case where the vehicle speed is further increased and the controller disengages the second clutch 5, and engages the third brake 7, the automatic transmission is shifted from the fifth speed to the sixth speed. In this case, the engagement of the first brake 3 is maintained. FIG. 8 shows the common velocity diagram in this state.

At the sixth speed, the first planetary gear set 1 is in the state identical to the cases of the fourth speed and the fifth speed. The first pinion carrier 14 is rotated at the rotation speed identical to that of the input shaft I. The rotation speed of the first sun gear 11 is 0 by the engagement of the first brake 3. The first ring gear 12 is rotated at the overdrive rotation speed.

In the second planetary gear set 2, the second pinon carrier 25 is rotated at the overdrive rotation speed identical to that of the first ring gear 12. The third sun gear 26 becomes the rotation speed 0 by the engagement of the third brake 7. The second ring gear 22 and the output member are rotated at the sixth speed (the gear ratio 0.435) which is higher than the fifth speed.

Besides, in this case, the second sun gear 21 is rotated at the overdrive rotation speed which is further higher than that of the second ring gear 22.

Hereinabove, the operation of the upshift at the D position is illustrated. A downshift at the D position is the operation in the direction opposite to the above-described upshift at the D position. However, the operations at the respective shift stages are identical to those of the upshift at the D position. Accordingly, those explanations are omitted.

Figure 9:
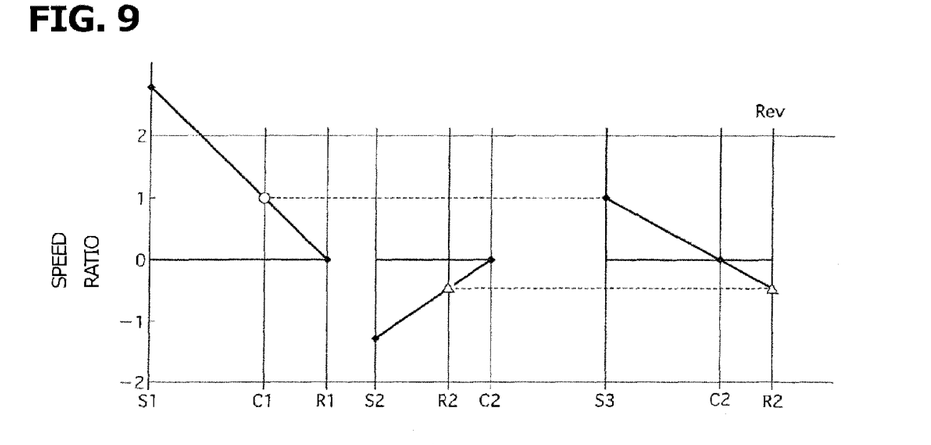
FIG. 9 is a common velocity view at a reverse speed in the automatic transmission for the vehicle according to the first embodiment.

Next, in a case where the driver moves the select lever to an R position (reverse; backward movement), the controller engages the second clutch 5 and the second brake 6. FIG. 9 shows the common line speed diagram in this state.

At this reverse movement, the first planetary gear set 1 is in the state identical to that of the first speed. The first pinion carrier 14 is rotated at the rotation speed identical to that of the input shaft I. The rotation speed of the first ring gear 12 is 0 by the engagement of the second brake 6. That first sun gear is rotated at the overdrive rotation speed.

In the single pinion side of the second planetary gear set 2, the second pinion carrier 25 is connected to the first ring gear 12. The rotation speed of the second pinion carrier 25 is 0 by the engagement of the second brake 6. The third sun gear 26 is rotated at the rotation speed identical to that of the input shaft I by the engagement of the second clutch 5. That second ring gear and the output member are rotated at the reverse stage which is the speed reduction rotation speed opposite to the driving direction of the engine (the gear ratio −2.133, − represents the direction opposite to the driving direction of the engine rotation speed).

Besides, in the automatic transmission according to this first embodiment, the ratio coverage (R/C value) is 6.336. It is possible to obtain wide gear ratio from the low shift stage to the high shift stage. Moreover, the reverse ratio/the first speed ratio (Rev/1st) becomes 0.773. There is little output difference with respect to the depression amount of the accelerator pedal at the start and the reverse movement. Accordingly, it is possible to prevent the unnatural feeling of the driver.

Next, details of a structure of the automatic transmission according to the first embodiment is illustrated based on FIG. 10 showing a section of the automatic transmission.

In FIG. 10, the input shaft I is connected through a torque converter 52 to an engine (not shown). The first planetary gear set 1 and the second planetary gear set 2 are disposed coaxially with the input shaft I. The second planetary gear set 2 is disposed on the left side (in the drawing) of the transmitting gear 50 which is the output member O, that is, on a side which is farther from the engine, adjacent to the transmitting gear 50. The first planetary gear set 1 is disposed on a side which is farther from the engine relative to the second planetary gear set 2, adjacent to the second planetary gear set 2.

The second ring gear 22 is attached with the transmitting gear 50. The transmitting gear 50 drives a differential gear device 51 through an idle shaft 53 having an idler gear. The differential gear device 51 drives left and right driving wheels (not shown) through left and right driving shafts 54.

The third brake 7, the first clutch 4, and the second clutch 5 are disposed on the right side of the drawing with respect to the transmitting gear 50, that is, a side which is near the engine, between the transmitting gear 50 and the pump housing 55.

A first connection member 56, a second connection member 57, and a third connection member 58 are provided for connecting the above-described members.

The first connection member 56 includes a drum portion 561, a connection portion 562, and a hollow shaft portion 563. The drum portion 561 is disposed on an engine side of the transmitting gear 50. Rotation side members of the third brake 7 are fit over and splined to an outer circumference side of the drum portion 561 which is opened on the engine side. Driven side members of the second clutch 5 are fit in and splined to an inner circumference side of the drum portion 561. The hollow shaft portion 563 includes one end portion which is connected through the connection portion 562 to the inner circumference side of this drum portion 561. The hollow shaft portion 563 passes through an inner circumference side of the transmitting gear 50. The other end side of the hollow shaft portion 563 is connected to the third sun gear 26.

The second connection member 57 includes a hub portion 571 and a hollow shaft portion 572. The hub portion 571 is disposed on the engine side of the drum portion 561 of the first connection member 56. The hub portion 571 is disposed on the engine side of the drum portion 561 of the first connection member 56. Driven side members of the first clutch 4 are fit over and splined to an outer circumference side of this hub portion 571. The hollow shaft portion 572 includes one end side connected to the inner circumference side of this hub portion 571. The hollow shaft portion 572 passes between the first connection member 56 and the input shaft I. The other end portion of the hollow shaft portion 572 is connected to the second sun gear 21.

The third connection member 58 includes a drum portion 581 and a connection portion 582. The drum portion 581 is disposed on the engine side of the drum portion 561 of the first connection member 56 to confront the drum portion 561 of the first connection member 56. Driving side members of the second clutch 5 are fit over and splined to an outer circumference side of the drum portion 581 which is opened on a side opposite to the engine side. Driving side members of the first clutch 4 are fit in and splined to an inner circumference side of the drum portion 581. The inner circumference side of this drum portion 581 is connected to the input shaft I by the connection portion 582 which is disposed to pass through the engine side of the hub portion 571 of the second connection member 57.

Moreover, the first brake 3 and the second brake 6 are disposed in this order toward the engine side in the axial direction, radially outside the first planetary gear set 1 and the second planetary gear set 2.

As described above, the automatic transmission according to the first embodiment attains following effects.

In the automatic transmission according to the first embodiment, the second planetary gear set 2 is the Ravigneaux type planetary gear set, so that four rotation elements are sufficient, relative to two set single pinion type which is constituted by six rotation elements. Moreover, one pinion carrier is sufficient in place of two pinion carrier.

Accordingly, by the decrease of the number of the elements, it is possible to decrease the axial size and the weight, and to attain the size reduction. Consequently, it is possible to improve the mountability to the vehicle. Moreover, it is possible to decrease the cost.

Moreover, it is possible to increase the ratio coverage to 6.366 relative to that of the conventional art. Moreover, in this case, it is possible to ensure the good step ratio. Accordingly, it is possible to improve the start characteristic and the climbing characteristic by the large driving force at the low shift stage. At the high shift stage, it is possible to decrease the engine speed, and to attain the decrease of the engine noise and the improvement of the fuel economy.

Moreover, in the automatic transmission according to the first embodiment, the reverse ratio/the first speed ratio (Rev/1st) is 0.773. There is little output difference between the start and the reverse movement with respect to the depression amount of the accelerator pedal. Accordingly, it is possible to prevent the unnatural feeling to the driver.

Furthermore, the third brake 7, the first clutch 4, and the second clutch 5 are disposed to be overlapped with one another in the radial direction, by using the first connection member 56 to the third connection member 58. Accordingly, it is possible to decrease the axial length.

Moreover, the first brake 3 and the second brake 6 are disposed radially outside the first planetary gear set 1 and the second planetary gear set 2. Consequently, it is possible to decrease the axial length. In this case, the first brake 3 and the second brake 6 are disposed to be arranged in the axial direction. Accordingly, it is possible to decrease the radial size of the portion of the automatic transmission which is opposite to the engine. Consequently, it is possible to prevent the interference with the vehicle body frame.

Second Embodiment

Next, an automatic transmission according to a second embodiment of the present invention is illustrated below.

Besides, portions identical to the structure of the first embodiment have the same symbols. These explanations are omitted.

Figure 11:
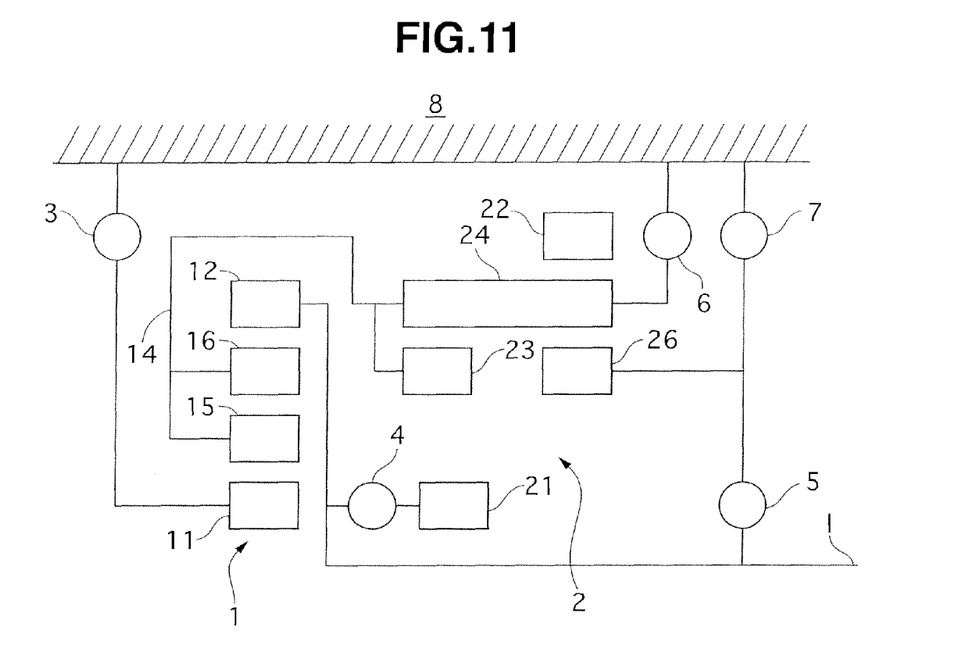
FIG. 11 is a view showing a skeleton of an automatic transmission for a vehicle according to a second embodiment of the present invention.

In the automatic transmission according to the second embodiment, the first planetary gear set 1 is merely varied from the single pinion type planetary gear according to the first embodiment to the double pinion type planetary gear set. Besides, the gear ratio, the ratio coverage (R/C value), and the reverse ratio/the first speed ratio (Rev/1st) are varied accordingly.

Besides, in the drawing, the position of the second brake 6 is varied. The second brake 6 is positioned between the second ring gear 22 and the third brake 7. However, the operation to fix that first ring gear 12 and the second pinion carrier 25 are not varied.

That is, the first planetary gear set 1 includes a first sun gear 11, a first ring gear 12, first inner pinions 15 which are engaged with the first sun gear 11 on an outer circumference of the first sun gear 11, and a first pinion carrier 14 which is engaged with the first pinions 15 and the first ring gear 12 between the first pinions 15 and the first ring gear 12.

The first sun gear 11, the first ring gear 12, and the first pinion carrier 14 are connected to the other members similarly to the first embodiment.

Besides, the gear ratio of the first planetary gear set 1 is set to 0.450. The gear ratio of the double pinion side of the second planetary gear set 2 is set to 0.384. Moreover, the gear ratio of the single pinion side of the second planetary gear set 2 is set to 0.497.

The other structures are identical to those of the first embodiment.

Figure 12:
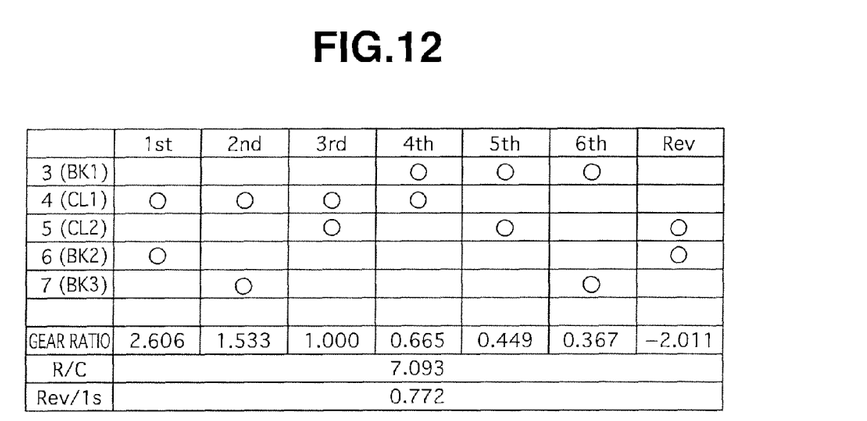
FIG. 12 is a view showing an operation table showing actuations of frictional engagement elements used in the automatic transmission for the vehicle according to the second embodiment, and gears in each shift stage.

An operation table of frictional engagement elements of the automatic transmission according to the second embodiment, the gear ratios of the respective shift stages, the ratio coverage, and reverse ratio/first speed ratio are shown in FIG. 12.

In the second embodiment, as to the operation, in the common velocity diagram, the speed axis R1 of the first ring gear 11 and the speed axis C1 of the first pinion carrier 14 are replaced. A distance with the speed axis S1 of the first sun gear 11 is varied. However, that operation is identical to that of the first embodiment. Accordingly, those explanations are omitted.

In the second embodiment, the gear ratio of the first speed is 2.606. The gear ratio of the second speed is 1.533. The gear ratio of the third speed is 1.000. The gear ratio of the fourth speed is 0.665. The gear ratio of the fifth speed is 0.449. The gear ratio of the sixth speed is 0.367. The gear ratio of the reverse movement is −2.011. The ratio coverage is 7.093. The reverse ratio/the first speed is 0.772.

In the automatic transmission according to the second embodiment, it is possible to attain the effects identical to those of the first embodiment. Moreover, the first planetary gear set 1 is the double pinion type planetary gear set. Accordingly, it is possible to attain the gear ratio which cannot be obtained in a case where the first planetary gear set 1 is the single pinion type, and to expand an application region to various engine.

Hereinabove, the present invention is illustrated based on the above-described embodiments. However, the present invention is not limited to the above-described embodiments. Variations and so on of design may be included as long as these are not deviated from the gist of the present invention.

For example, the above-described values $\alpha 1 \sim \alpha 3$ are not limited to the values of the embodiments. It is possible to appropriately vary if necessary.

Moreover, the automatic transmission according to the present invention is not limited to the engine front position front wheel driving vehicle, and an engine rear position rear wheel driving vehicle.

The invention claimed is:
1. An automatic transmission for a vehicle comprising:
an input shaft;
an output member;
a stationary portion;
a first planetary gear set including three rotation elements that are a first sun gear, a first ring gear, and a first pinion carrier, which are respectively defined as a first element, a third element, and a second element;
a second planetary gear set which is a Ravigneaux type, and which includes a second sun gear, a third sun gear, a second pinion engaged with the second sun gear, a third pinion engaged with the second pinon and the third sun gear, a second pinion carrier which rotatably supports the second pinion and the third pinion, and a second ring gear engaged with the third pinion; and
five frictional engagement elements that are a first clutch, a second clutch, a first brake, a second brake, and a third brake,
the input shaft being constantly connected to the second element, the input shaft being connected to the second sun gear by an engagement of the first clutch, and the input shaft being engaged with the third sun gear by an engagement of the second clutch,
the output member being constantly connected to the second ring gear, the first element being fixed to the stationary portion by an engagement of the first brake, the third element being constantly connected to the second pinion carrier, and the third element being fixed to the stationary portion by an engagement of the second brake, and the third sun gear being fixed to the stationary portion by an engagement of the third brake.

2. The automatic transmission for the vehicle as claimed in claim 1, wherein the first clutch is engaged at a first gear ratio, a second gear ratio, a third gear ratio, and a fourth gear ratio; the second clutch is engaged at the third gear ratio, a fifth gear ratio, and a reverse gear ratio; the first brake is engaged at the fourth gear ratio, the fifth gear ratio, and a sixth gear ratio; and the second brake is engaged at the first gear ratio and the reverse gear ratio; and the third brake is engaged at the second gear ratio and the sixth gear ratio.

3. The automatic transmission for the vehicle as claimed in claim 1, wherein the first planetary gear set is a single pinion type planetary gear set.

4. The automatic transmission for the vehicle as claimed in claim 1, wherein the first brake and the second brake are disposed on a side which is farther from a driving source with respect to the output member in an axial direction; the third brake, the first clutch, and the second clutch are disposed on a side which is nearer to the driving source with respect to the output member in the axial direction; the second clutch is disposed radially inside the third brake; the first clutch is disposed radially inside the second clutch; the first brake and the second brake are disposed radially outside the first planetary gear set and the second planetary gear set; and the second brake is disposed on a side which is nearer to the driving source than the first brake in the axial direction.

5. The automatic transmission for the vehicle as claimed in claim 1, wherein the automatic transmission further comprises a first connection member that includes an outer circumference portion to which the third brake is connected, and an inner circumference portion to which the second clutch is connected; the first connection member is connected through an inner circumference side of the output member to the third sun gear; the automatic transmission further comprises a second connection member which includes an outer circumference portion to which the first clutch is connected; the second connection member is connected through an inner circumference side of the first connection member to the second sun gear; the automatic transmission further comprises a third connection member which includes an inner circumference portion to which the first clutch is connected; and the third connection member is connected to the input shaft through a portion of the second connection member which is nearer to the driving source in the axial direction.

6. An automatic transmission for a vehicle, comprising:
an input shaft;
an output member;
a stationary portion;
a first planetary gear set including three rotation elements that are a first sun gear, a first ring gear, and a first pinion carrier, which are respectively defined as a first element, a second element, and a third element;
a second planetary gear set which is a Ravigneaux type, and which includes a second sun gear, a third sun gear, a second pinion engaged with the second sun gear, a third pinion engaged with the second pinon and the third sun gear, a second pinion carrier which rotatably supports the second pinion and the third pinion, and a second ring gear engaged with the third pinion; and five frictional engagement elements that are a first clutch, a second clutch, a first brake, a second brake, and a third brake, the input shaft being constantly connected to the second element, the input shaft being connected to the second sun gear by an engagement of the first clutch, and the input shaft being engaged with the third sun gear by an engagement of the second clutch, the output member being constantly connected to the second ring gear, the first element being fixed to the stationary portion by an engagement of the first brake, the third element being constantly connected to the second pinion carrier, and the third element being fixed to the stationary portion by an engagement of the second brake, and the third sun gear being fixed to the stationary portion by an engagement of the third brake.

7. The automatic transmission for the vehicle as claimed in claim 6, wherein the first clutch is engaged at a first gear ratio, a second gear ratio, a third gear ratio, and a fourth gear ratio; the second clutch is engaged at the third gear ratio, a fifth gear ratio, and a reverse gear ratio; the first brake is engaged at the fourth gear ratio, the fifth gear ratio, and a sixth gear ratio; and the second brake is engaged at the first gear ratio and the reverse gear ratio; and the third brake is engaged at the second gear ratio and the sixth gear ratio.

8. The automatic transmission for the vehicle as claimed in claim 6, wherein the first planetary gear set is a double pinion type planetary gear set.

9. The automatic transmission for the vehicle as claimed in claim 6, wherein the first brake and the second brake are disposed on a side which is farther from a driving source with respect to the output member in an axial direction;

the third brake, the first clutch, and the second clutch are disposed on a side which is nearer to the driving source with respect to the output member in the axial direction;

the second clutch is disposed radially inside the third brake;

the first clutch is disposed radially inside the second clutch;

the first brake and the second brake are disposed radially outside the first planetary gear set and the second planetary gear set; and the second brake is disposed on a side which is nearer to the driving source than the first brake in the axial direction.

10. The automatic transmission for the vehicle as claimed in claim 6, wherein the automatic transmission further comprises a first connection member that includes an outer circumference portion to which the third brake is connected, and an inner circumference portion to which the second clutch is connected;

the first connection member is connected through an inner circumference side of the output member to the third sun gear;

the automatic transmission further comprises a second connection member which includes an outer circumference portion to which the first clutch is connected;

the second connection member is connected through an inner circumference side of the first connection member to the second sun gear;

the automatic transmission further comprises a third connection member which includes an inner circumference portion to which the first clutch is connected; and the third connection member is connected to the input shaft through a portion of the second connection member which is nearer to the driving source in the axial direction.

\* \* \* \* \*